(12) United States Patent
Kim et al.

(10) Patent No.: US 9,277,119 B2
(45) Date of Patent: Mar. 1, 2016

(54) ELECTRONIC APPARATUS, METHOD FOR CONTROLLING THE SAME, AND COMPUTER READABLE RECORDING MEDIUM

(71) Applicant: SAMSUNG ELECTRONICS CO., LTD., Suwon-si, Gyeonggi-do (KR)

(72) Inventors: Soon-ae Kim, Yongin-si (KR); Oh-hyun Kwon, Seoul (KR); Jin-a Jeon, Seoul (KR); Myoung-kyoung Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 14/190,551

(22) Filed: Feb. 26, 2014

(65) Prior Publication Data

US 2014/0240545 A1  Aug. 28, 2014

(30) Foreign Application Priority Data

Feb. 28, 2013 (KR) ........................ 10-2013-0022457

(51) Int. Cl.
*H04N 5/232* (2006.01)
(52) U.S. Cl.
CPC ........... *H04N 5/23232* (2013.01); *H04N 5/232* (2013.01); *H04N 5/23235* (2013.01); *H04N 5/23293* (2013.01); *G06T 2210/52* (2013.01)
(58) Field of Classification Search
None
See application file for complete search history.

(56) References Cited

U.S. PATENT DOCUMENTS

| | | | | |
|---|---|---|---|---|
| 6,094,230 | A * | 7/2000 | Han | 348/564 |
| 7,027,665 | B1 | 4/2006 | Kagle et al. | |
| 8,045,824 | B2 * | 10/2011 | Kwon et al. | 382/282 |
| 2002/0113885 | A1 | 8/2002 | Inoue et al. | |
| 2004/0189819 | A1 | 9/2004 | Saito | |
| 2006/0239296 | A1 * | 10/2006 | Jinzaki et al. | 370/468 |
| 2010/0253849 | A1 * | 10/2010 | Kegasawa | 348/584 |

(Continued)

FOREIGN PATENT DOCUMENTS

| | | |
|---|---|---|
| EP | 0 938 237 A2 | 8/1999 |
| JP | 11-239329 A | 8/1999 |

(Continued)

OTHER PUBLICATIONS

European Search Report issued for related application EP 14156104.3, Aug. 10, 2015, 3 pages.

(Continued)

*Primary Examiner* — Sinh Tran
*Assistant Examiner* — Mark Monk
(74) *Attorney, Agent, or Firm* — Drinker Biddle & Reath LLP (57) ABSTRACT

An electronic apparatus is described. The electronic apparatus includes an image capture unit, a first image processor, a second image processor, a display unit, and an image storage unit. The image capture unit generates an input image by a photoelectric conversion of incident light. The first image processor generates a display image from the input image and generates a first stored image from the first input image. The input image is divided into a first input image and a second input image. The second image processor generates a second stored image from the second input image. The display unit displays the display image. The image storage unit stores a combined stored image. The combined stored image is a combination of the first stored image and the second stored image.

19 Claims, 4 Drawing Sheets

(56) References Cited

U.S. PATENT DOCUMENTS

| | | |
|---|---|---|
| 2011/0122262 A1 | 5/2011 | Shinozaki et al. |
| 2011/0150411 A1* | 6/2011 | Sugiyama .................... 386/224 |
| 2012/0087594 A1 | 4/2012 | Lee et al. |
| 2012/0218438 A1 | 8/2012 | Ohba et al. |
| 2012/0300124 A1 | 11/2012 | Yamashita |

FOREIGN PATENT DOCUMENTS

| | | |
|---|---|---|
| JP | 2003-037816 A | 2/2003 |
| JP | 2003-284051 A | 10/2003 |
| JP | 2011-097521 A | 5/2011 |
| KR | 10-2010-0132429 A | 12/2010 |
| KR | 10-1085554 B1 | 11/2011 |

OTHER PUBLICATIONS

Examination Report issued for related application EP 14156104.3, Aug. 20, 2015, 7 pages.

* cited by examiner

FIG. 5

ELECTRONIC APPARATUS, METHOD FOR CONTROLLING THE SAME, AND COMPUTER READABLE RECORDING MEDIUM

CROSS-REFERENCE TO RELATED APPLICATIONS

This application claims the priority benefit under 35 U.S.C. §119(a) from Korean Patent Application No. 10-2013-0022457, filed on Feb. 28, 2013, in the Korean Intellectual Property Office, the disclosure of which is incorporated by reference herein in its entirety.

BACKGROUND

1. Field

One or more embodiments relate to an electronic apparatus, a method of controlling the same, and a computer readable recording medium having recorded thereon a program for performing the method.

2. Related Art

As imaging technology changes from analog methods to digital methods, in order to provide a more realistic image, the imaging technology has developed from a Standard Definition (SD) format to a High Definition (HD) format. The SD format has an image resolution of 704×480 and is composed of approximately 350,000 pixels. The HD format differs from a Full High Definition (FHD) format which has a higher image resolution. The FHD format has an image resolution of 1920×1080 and is composed of 2,000,000 pixels, therefore, the FHD format has a substantially higher picture quality compared to the SD format.

Recently, imaging technology has developed again from the FHD format to an Ultra High Definition (UHD) format. Since the UHD format supports higher image resolution than FHD, the UHD format is highlighted as the next generation image for media environments. The UHD format includes a 4K (3840×2160) image resolution and an 8K (7680×4320) image resolution, and supports up to a 22.2 channel surround sound. Compared to the HD image, the 4K UHD image has 4 times higher picture quality, and the 8K UHD image has 16 times higher picture quality.

Much research has been conducted to enable electronic apparatuses such as digital cameras to generate UHD-level resolution images. It is important not only to process a photographed image into a UHD-level resolution image, but also to reduce delay of the actual image relative to the image displayed on a display unit of the electronic apparatus.

SUMMARY

One or more embodiments of the invention include an electronic apparatus and a method of controlling the same, in which the electronic apparatus reduces an image display delay that may occur until an input actual image is displayed on a display unit of the electronic apparatus, to then display the delay-reduced image on the display unit, and in which the image stored in a storage unit has a super high resolution, and a computer readable recording medium having recorded thereon a program for performing the method.

Additional embodiments will be set forth in part in the description which follows and, in part, will be apparent from the description, or may be learned by practice of the presented embodiments.

According to one or more embodiments of the invention, an electronic apparatus includes an image capture unit, a first image processor, a second image processor, a display unit, and an image storage unit. The image capture unit generates an input image by a photoelectric conversion of incident light. The first image processor generates a display image from the input image and generates a first stored image from the first input image. The input image is divided into a first input image and a second input image. The second image processor generates a second stored image from the second input image. The display unit displays the display image. The image storage unit stores a combined stored image. The combined stored image is a combination of the first stored image and the second stored image.

The first input image and the second input image may be provided to one of the first image processor or the second image processor. The first image processor and the second image processor may independently generate the first stored image and the second stored image, respectively, and the first stored image and the second stored image may be combined in one of the first image processor or the second image processor.

The first image processor may include a display image processing unit that generates the display image from the input image. The display image and the input image may have a same frame rate and viewing angle. The first image processor may further include a first stored image processing unit that generates the first stored image from the first input image, corresponding to a portion of the divided input image.

The second image processer may include a second stored image processing unit that generates the second stored image, with the same frame rate and definition as the first stored image, from the second input image. The second input image is an image other than the first input image of the divided input image.

The input image may not be stored in a first memory in the first image processor, but directly input to the display image processing unit, and the first input image and the second input image may be stored in the first memory.

The combined stored image may be an image with an Ultra High Definition (UHD)-level resolution.

The electronic apparatus may further include a pre-processing unit that processes the input image into the first input image and the second input image that may be processed by the first image processor and the second image processor.

The pre-processing unit may include: a size adjustment unit that adjusts a size of the input image, and outputs the size-adjusted input image to the first image processor; and an image division unit that divides the input image into the first input image and the second input image, and outputs the first input image to the first image processor and the second input image to the second image processor.

The image division unit may divide the input image by frames for a time division, or divide the input image by screen areas displayed on the display unit for a space division.

The image division unit may divide the input image according to a definition of the combined stored image. The definition may be set by a user of the electronic apparatus.

The electronic apparatus may include at least two image processors for processing the input image. A processing performance of the pre-processing unit may be proportional to a number of image processors included in the electronic apparatus, rather than the processing performance of any one of the image processors.

According to one or more embodiments of the invention, a method of controlling an electronic apparatus is described. The method includes generating an input image by a photoelectric conversion of incident light; generating a display image from the input image; displaying the display image;

generating a first stored image and a second stored image from a first input image and a second input image, wherein the first input image and the second input image are divided from the input image; and storing a combined stored image, wherein the combined stored image is a combination of the first stored image and the second stored image.

The first stored image and the second stored image may be independently and respectively generated from separate image processors.

The display image may maintain a same frame rate and viewing angle as the input image, and the first stored image and the second stored image may have a same frame rate and definition.

The combined stored image may be an image with an Ultra High Definition (UHD)-level resolution.

The method may further include adjusting a size of the input image and generating the display image from the size-adjusted input image.

The method may further include dividing the input image into the first input image and the second input image and generating the first stored image and the second stored image from the first and second input images, respectively.

The input image may be divided by a time division process, which divides the input image by frames, or a space division process, which divides the input image by screen areas.

The input image may be divided according to a definition of the combined stored image set by a user of the electronic apparatus.

According to one or more embodiments of the invention, a non-transitory computer-readable recording medium having recorded thereon a program, which, when executed by a computer, performs the method of controlling an electronic apparatus.

BRIEF DESCRIPTION OF THE DRAWINGS

These and/or other embodiments will become apparent and more readily appreciated from the following description of various embodiments, taken in conjunction with the accompanying drawings in which.

DETAILED DESCRIPTION

Reference will now be made in detail to various embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "image" includes both still images and moving images. Expressions such as "at least one of," when preceding a list of elements, modify the entire list of elements and do not modify the individual elements of the list.

Figure 1:
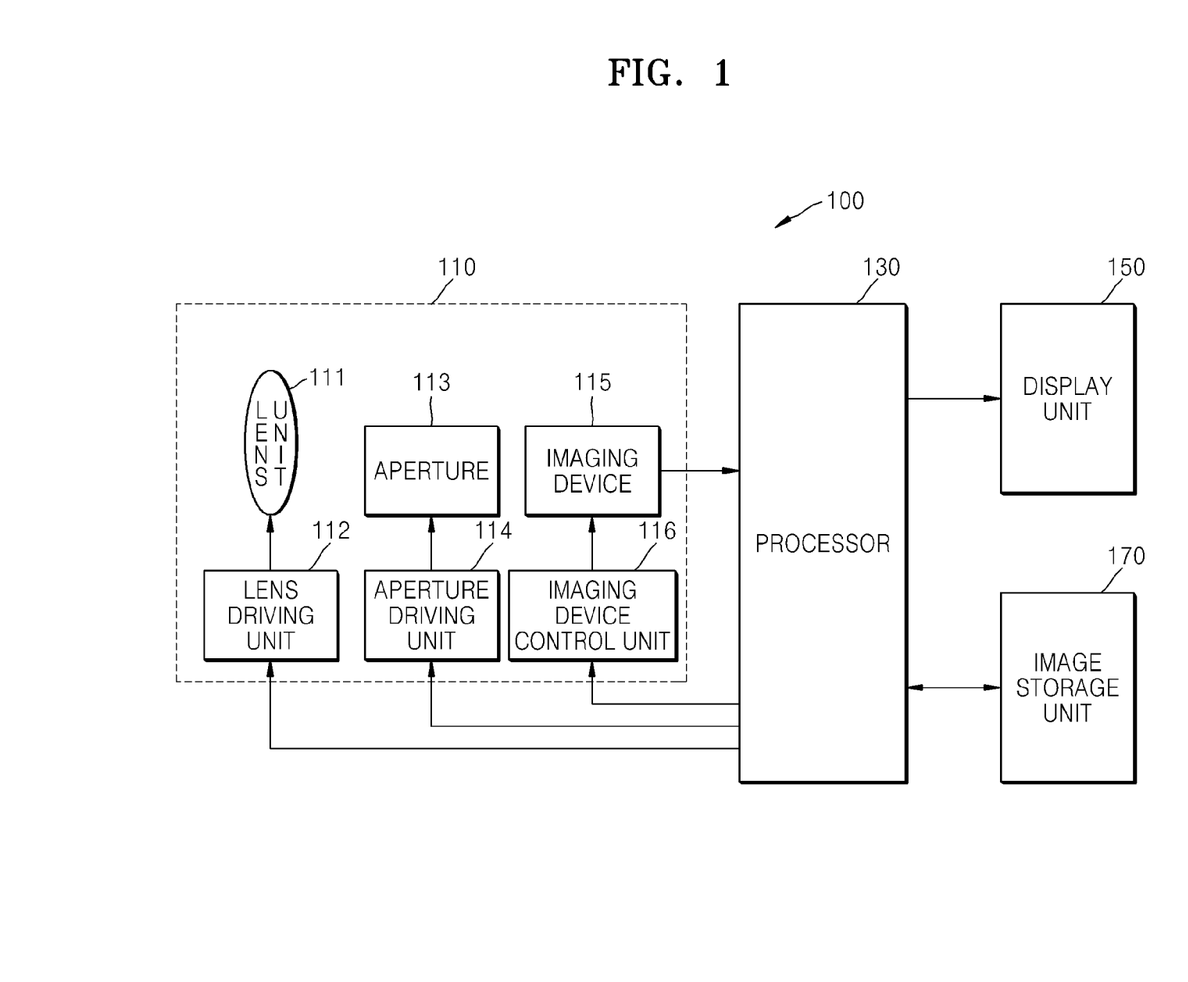
FIG. 1 is a block diagram illustrating a structure of an electronic apparatus.

FIG. 1 is a block diagram illustrating one example of an electronic apparatus (e.g., a photographing apparatus 100), according to an embodiment. Hereinafter, according to an embodiment, the present disclosure will be described in detail, using a digital camera as an example of the photographing apparatus 100. However, the photographing apparatus 100 is not limited to the digital cameras; rather, the photographing apparatus 100 may be applied to various portable devices with camera modules or image capturing modules, such as smart phones, cellular phones, personal digital assistants (PDAs), portable multimedia players (PMPs), camcorders, or other electronic apparatuses with an image capturing capability.

According to an embodiment, the photographing apparatus 100 may include a photographing unit 110 (e.g., an image capture unit), a processor 130, a display unit 150, and an image storage unit 170. It may be understood by one of ordinary skill in the art related to the embodiment that the photographing apparatus 100 may further include additional (e.g., general-use) elements other than the elements shown in FIG. 1.

The photographing unit 110 generates an image with electrical signals from incident light (e.g., via photoelectric conversion), and includes a lens unit 111, a lens driving unit 112, an aperture 113, an aperture driving unit 114, an imaging device 115, and an imaging device control unit 116.

The lens unit 111 may include a plurality of groups or a plurality of sheets of lenses. The position of the lens unit 111 is adjusted by the lens driving unit 112. The lens driving unit 112 adjusts the position of the lens unit 111 according to control signals from the processor 130.

The degree of opening and closing of the aperture 113 is controlled by the aperture driving unit 114. The aperture 113 adjusts the amount of the incident light reaching the imaging device 115.

When optical signals that passed through the lens unit 111 and the aperture 113 reach a light receiving surface of the imaging device 115, the optical signals generate an image of a subject. The imaging device 115 may be a charge-coupled device (CCD) imaging device or a complementary metal-oxide-semiconductor (CMOS) imaging device, which converts optical signals into electrical signals. The sensitivity of the imaging device 115 may be adjusted by the imaging device control unit 116. The imaging device control unit 116 may control the imaging device 115 based on automatic control signals produced based on a real time image signal input, or manual control signals input by a user.

A light exposure time of the imaging device 115 is adjusted by a shutter (not shown). The shutter in one example includes a mechanical shutter, which moves a lens shade to adjust the amount of light exposure; or an electronic shutter, which transfers electrical signals to the imaging device 115 to control the amount of light exposure.

Regarding analog signals transferred from the imaging device 115, an analog signal processing unit (not shown) may perform one or more of noise reduction, gain control, wave shaping, or analog-to-digital conversion. The signals processed by the analog signal processing unit are provided to the processor 130 as an input image.

The processor 130 processes image signals (e.g., the input image) and controls various elements of the photographing apparatus 100. The processor 130 may be embodied into a combined single-chip as shown in FIG. 1, or, contrary to FIG. 1, into a plurality of separated chips. The processor 130 may include various types of processors such as a central processing unit (CPU), a micro processing unit (MPU), a micro controller unit (MCU), a digital signal processor (DSP), or a graphic processing unit (GPU); and one or more memories. A memory (not shown) may include a plurality of memories. One of the memories may act as a main memory for the photographing apparatus 100. Processors that do not have a built-in memory may temporarily store necessary information in the main memory while activating.

The processor 130 may process image signals for the images displayed on the display unit 150. For example, the processor 130 may perform one or more of luminance level adjustment, color correction, contrast adjustment, edge enhancement, or the like. Also, regarding the image signals, in order to improve image quality, the processor 130 may further perform image signal processes such as noise reduction, gamma correction, color filter array interpolation, color matrix, color enhancement, and the like. In addition, the processor 130 may perform processes including one or more of image interpretation, image recognition, image effect, generation of sub-images, or image synthesis. As the image recognition process, facial recognition and scene recognition processes may be performed.

The processor 130 may perform a compressing process after the image signal process. An image compression method may be lossless or lossy. Examples of an image compression format follow: a still image may be converted into a joint photographic experts group (JPEG) or JPEG 2000 format; as for a moving image, based on a moving picture experts group (MPEG) standard, a moving image file may be generated by compressing a plurality of frames. An image file may be generated based on a standard such as an exchangeable image file format (Exif). Also, the processor 130 may restore an image stored in the image storage unit 170 as image data.

Also, the processor 130 may execute programs stored in the memory, or, by using a separate module, generate control signals for controlling one or more of auto-focus, zoom alteration, focal alteration, auto-exposure correction, or the like; transfer the control signals to the lens driving unit 112, the aperture driving unit 114, or the imaging device control unit 116; and may have general control over the actions of the elements provided on the photographing apparatus 100, such as the shutter and a flash (not shown).

The display unit 150 receives an image from the processor 130, in which the image has undergone a predetermined image signal process in order to be displayed on the display unit 150 (hereinafter, "display image"). In more detail, the display image, which has undergone the predetermined image signal process in order to be displayed on the display unit 150, is stored in the memory, and a display driving unit (not shown) in the processor 130 reads and transfers the stored display image to the display unit 150. The display unit 150 displays the stored display image on a screen of the display unit 150.

The image storage unit 170 receives an output image from the processor 130, in which the output image has undergone the predetermined image signal process and the compression process in order to be stored in the image storage unit 170 (hereinafter, "stored image"). In more detail, the stored image, which has undergone the predetermined image signal process and compression process in order to be stored in the image storage unit 170, is stored in a memory (not shown), and a store/read control unit (not shown) in the processor 130 reads the stored image from the memory and transfers the stored image to the image storage unit 170. The stored image is stored in the image storage unit 170. Also, the store/read control unit reads the image data from the stored image in the image storage unit 170, and provides the stored image to the display driving unit using the memory or other channels, and lets the stored image be displayed on the display unit 150. The image storage unit 170 may be a unit detachable from, or a unit permanently attached to, the photographing apparatus 100.

An operation unit (not shown) is where the user can provide input control signals. The operation unit may include various functional buttons such as a shutter-release button, which provides an input control signal for releasing a shutter to make light exposed to the imaging device 115 for a certain amount of time to photograph pictures; a moving image recording button, which provides an input control signal to start and stop video recording; a power button, which provides an input control signal to control power on and off; a zoom button, which widens or narrows a viewing angle according to the input control signals; a mode select button; or other buttons to adjust photographing settings. The shutter-release button and the moving image recording button may be embodied as a whole or separately. The operation unit may include various buttons as described above, but is not limited thereto, and may be embodied into any form that a user can provide input control signals, such as a touch screen, a touch pad, or a remote control device.

Figure 2:
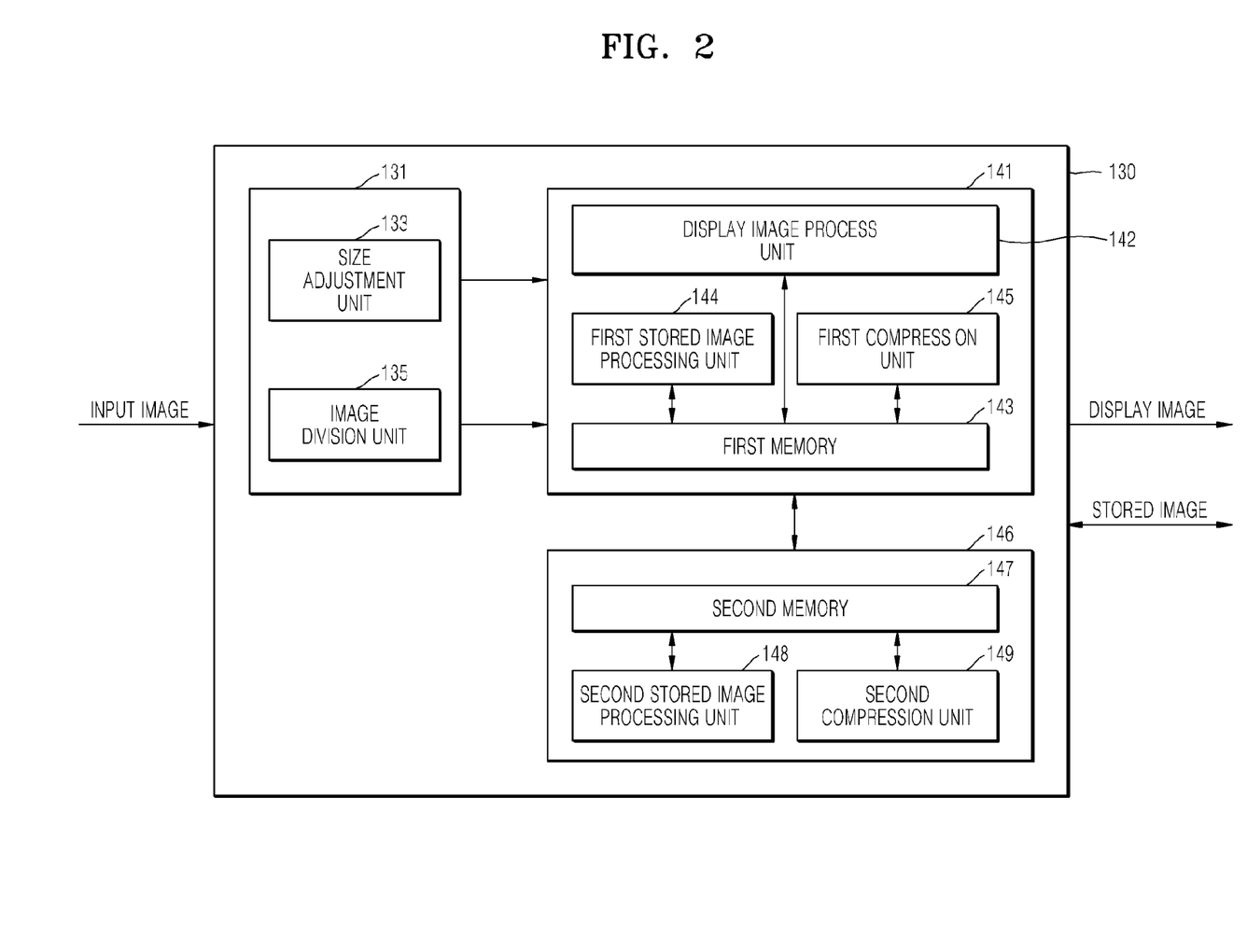
FIG. 2 is a detailed block diagram illustrating a processor of the electronic apparatus of FIG. 1, according to an embodiment.

FIG. 2 is a detailed block diagram illustrating the processor 130, according to an embodiment. As shown in FIG. 2, the processor 130 includes a pre-processing unit 131, a first image processor 141, and a second image processor 146. It may be understood by one of ordinary skill in the art related to the present embodiment that general-use elements other than the processor modules shown in FIG. 2 may be further included.

According to an embodiment, in order to process an Ultra High Definition (UHD) image, the photographing apparatus 100 divides the input image provided to the processor 130 into at least two input images; instructs at least two image processors to perform imaging processes; and uses one or more of the image processors to combine the divided images. That is, in order to process a high definition image which may be difficult to process with just one image processor, the photographing apparatus 100 uses at least two image processors to process a photographed image into a high definition image. Hereinafter, for the convenience of description, the embodiment will be described with respect to a case of using two image processors to process a high definition image, in which the input image provided to the processor 130 is divided into first and second input images.

According to an embodiment, the photographing apparatus 100 divides the input image provided to the processor 130 into the first and second input images, and independently process the first and second input images in the first image processor 141 and the second image processor 146, respectively. Then, in order to process the UHD image from the independently processed images, the photographing apparatus 100 combines and stores the independently processed images. Here, while the photographing apparatus 100 performs a high definition imaging process for the photographed images to provide an UHD image, and store the stored image in the image storage unit 170, a separate imaging process is performed and the display image is displayed on the display unit 150, in order to reduce the delay until the display image is displayed on the display unit 150 thereof. Related to the embodiment above, a specific description referring to FIG. 2 will be given below.

For the analog signal, which is transferred from the imaging device 115 to an analog signal processing unit (not shown), processes such as noise reduction, gain control, wave shaping, and analog-to-digital conversion are performed and then the input image is provided to the processor 130. The input image provided to the processor 130 is transferred to the pre-processing unit 131.

The pre-processing unit 131 processes the input image into an image which may be processed by the first image processor 141 and the second image processor 146. The pre-processing unit 131 includes a size adjustment unit 133 and an image division unit 135. Because the photographing apparatus 100 may include at least two image processors for processing the input images, the processing performance of the pre-processing unit 131 may be proportional to the number of image processors included in the photographing apparatus 100, rather than the processing performance of any one of the image processors. For example, when there are two image processors in total, such as the first image processor 141 and the second image processor 146, the processing performance of the pre-processing unit 131 may be twice the processing performance of the first image processor 141 or the second image processor 146.

The size adjustment unit 133 adjusts the size of the input image and transfers the input image to the first image processor 141. Specifically, the size adjustment unit 133 adjusts the input image provided to the processor 130 into an appropriate size to be displayed on the display unit 150, in order for the first image processor 141 to smoothly generate the display image for the display unit 150. The size adjustment unit 133 may take the resolution supported by the display unit 150, or the processing performance of a display image process unit 142 of the first image processor 141 into account, and adjusts the size of the input image.

The image division unit 135 divides the input image into the first and second input images and outputs the divided images to the first image processor 141. The image division unit 135 may perform a time division, which divides the input image by frames; or a space division, which divides the input image by screen areas on the display unit 150. For example, when performing the time division, the image division unit 135 may divide the frames of the input image into odd numbered and even numbered frames; set odd numbered frames as the first input image, and the even numbered frames as the second input image; and then, transfer the divided images to the first image processor 141. Furthermore, when performing the space division, the image division unit 135 may divide the input image by the screen areas on the display unit 150, and set the frames of the input image corresponding to a first area as the first input image, and the frames thereof corresponding to a second area as the second input image; and transfer the divided images to the first image processor 141. Contrary to FIG. 2, the image division unit 135 may transfer the first and second input images to the second image processor 146, instead of the first image processor 141. Hereinafter, for the convenience of description, the embodiment will be described on the premise of the image division unit 135 transferring the first and second input images to the first image processor 141.

The image division unit 135 divides the input image according to the definition of the stored image set by the user of the photographing apparatus 100. For example, if the user thereof sets the resolution of the stored image as UHD, the image division unit 135 may perform the time division or space division on the input image. If the user thereof sets the resolution of the stored image as HD, the image division unit 135 may not divide the input image but directly transfer the input image to the first image processor 141.

As in FIG. 2, the first image processor 141 may include the display image process unit 142, a first stored image processing unit 144, and a first compression unit 145. The first image processor 141 generates a display image from the input image. The first image is divided into the first input image and the second input image. The first image processor 141 generates a first stored image from the first input image.

The display image process unit 142 generates display images from input images. The generated display images have the same frame rate and viewing angle as those of the input images. A size-adjusted input image provided by the size adjustment unit 133, is not stored in a first memory 143 in the first image processor 141 in one example, but is directly input to the display image process unit 142. The display image process unit 142 generates the display image from the size-adjusted input image. The generated display image has the same frame rate and viewing angle as those of the input image.

The first input image and the second input image, which are output from the image division unit 135, are stored in the first memory 143 in the first image processor 141. The first stored image processing unit 144 generates the first stored image from the first input image, which is a portion of the divided input image. The first compression unit 145 compresses the generated first stored image into an appropriate format.

The second input image stored in the first memory 143 is transferred to the second image processor 146 by an image transfer interface such as a mobile industry processor interface (MIPI). That is, when the first input image stored in the first memory 143 is processed by the first stored image processing unit 144, the second input image stored in the first memory 143 is transferred to the second image processor 146, and stored in a second memory 147 in the second image processor 146. Contrary to FIG. 2, if the first and second input images divided by the image division unit 135 are output to the second image processor 146 instead of the first image processor 141, and then, when the second input image stored in the second memory 147 is processed by a second stored image processing unit 148, the first input image stored in the second memory 147 is transferred to the first image processor 141, and stored in the first memory 143 in the first image processor 141.

That is, in order to independently process the first and second input images in the first image processor 141 and the second image processor 146, respectively, the first image processor 141 and the second image processor 146 have the first and second input images, respectively. A delay may occur during the division process using the image transfer interface to transfer the second input image to the second image processor 146 or the first input image to the first input image processor 141. In one example, the display image process unit 142 is separately included in the first image processor 141 so as to not be influenced by the delay that may occur during the division process, to thus reduce an image display delay that may occur until the actual image input in the photographing apparatus 100 (e.g., the display image) is displayed on the display unit 150 of the photographing apparatus 100. The display image process unit 142 may also be separately included to display the delay-reduced image on the display unit 150, to thereby allow the user of the photographing apparatus 100 to identify live view images and to simultaneously store high definition images, and thus improve the processing performance of the photographing apparatus 100 and increase user-convenience.

The second image processor 146 includes the second memory 147, the second stored image processing unit 148, and a second compression unit 149. The second image processor 146 generates a second stored image from the second input image, which is an image other than the first input image of the divided input image.

The first and second input images output from the image division unit 135, are stored in the first memory 143 in the first image processor 141. From the stored images, the second input image is transferred to the second image processor 146 by the image transfer interface, and stored in the second memory 147 in the second image processor 146. The second stored image processing unit 148 receives the second input image from the second memory 147, and generates the second stored image which has the same frame rate and resolution as those of the first stored image. The second compression unit 149 compresses the generated second stored image into an appropriate format.

The first and second stored images having undergone the imaging process and the compression process by the first image processor 141 and the second image processor 146, respectively, are combined in any one of the first image processor 141 or the second image processor 146. Before the combination process, the first stored image, which has undergone imaging process and was compressed by the first image processer 141, is transferred to the second image processor 146; or, the second stored image, which has been image processed and compressed by the second image processor 146, is transferred to the first image processor 141. A delay may occur during the combination process using the image transfer interface, in which the combination process includes transferring the first input image to the second image processor 146 or the second input image to the first input image processor 141. In one example, the display image process unit 142 is separately included in the first image processor 141 so as to not be influenced by the delay that may occur during the division process, to thus reduce an image display delay that may occur until the actual image input in the photographing apparatus 100 is displayed on the display unit of the photographing apparatus 100. The display image process unit 142 may also be included separately to display the delay-reduced image on the display unit 150, to thereby allow the user of the photographing apparatus 100 to identify live view images and to simultaneously store high definition images, and thus improve the processing performance of the photographing apparatus 100 and increase user-convenience. The stored image, which is a combination of the first and second stored images, may have a UHD-level resolution.

Figure 3:
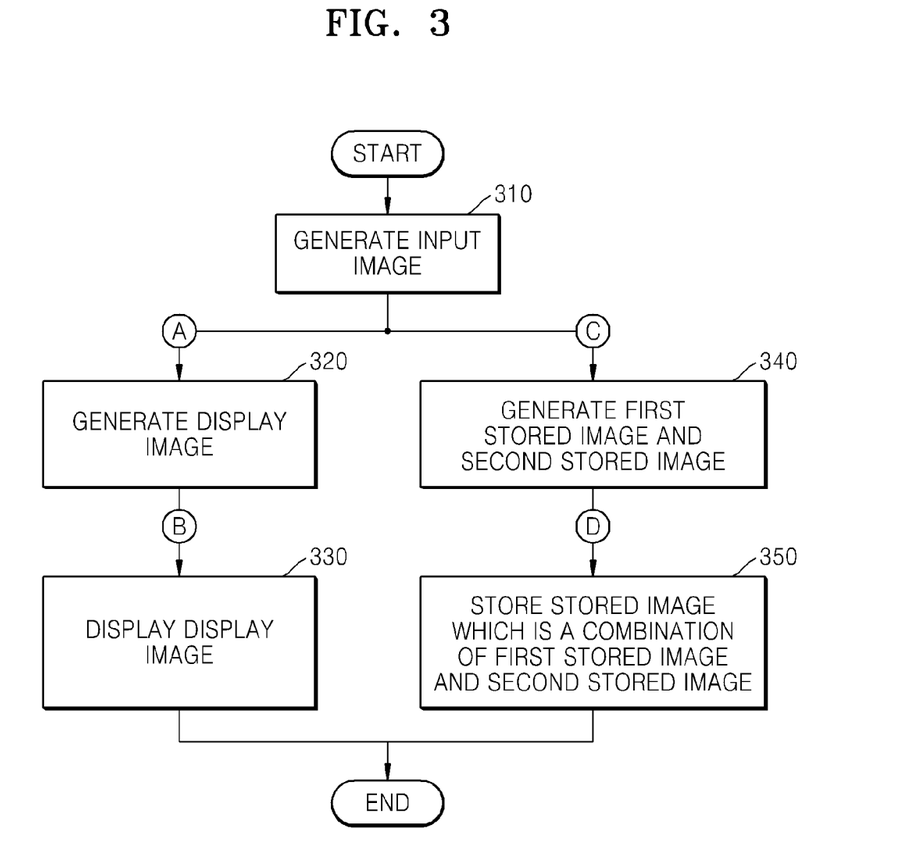
FIG. 3 is a flowchart illustrating a method of controlling the electronic apparatus of FIG. 1, according to an embodiment.

FIG. 3 is a flowchart illustrating a method of controlling an electronic apparatus (e.g., the photographing apparatus 100). Hereinafter, even if omitted, the description regarding the photographing apparatus 100 may be applied to other electronic apparatuses according to the embodiments.

In operation 310, an input image is generated by a photo-electric conversion of incident light.

In operation 320, the display image is generated from the input image. Here, the display image maintains the frame rate and the viewing angle of the input image. The process of generating the display image from the input image is independently performed from the process of generating the first and second stored images from the first and second input images, respectively, in which the first and second input images are divided from the input image. In one example, separately generating a display image that is different from the stored image provides a reduction in the effect of delay that may occur during the process of generating a high-definition stored image. Hereinafter, operation 320, which is a process of generating the display image, will be described in more detail by referring to FIG. 4.

Figure 4:
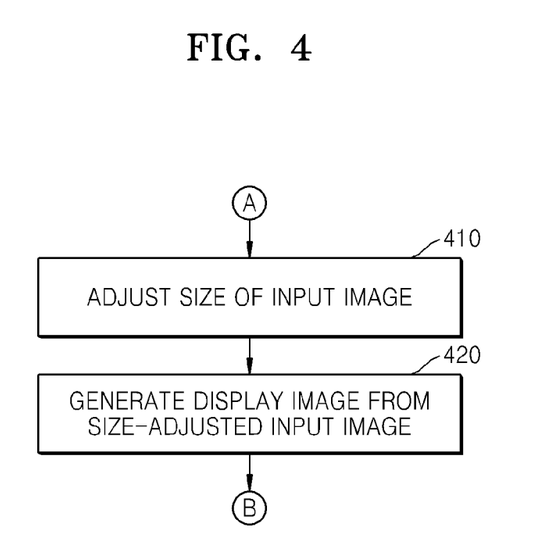
FIG. 4 is a detailed flowchart illustrating a process of generating a display image for the method of FIG. 3, according to an embodiment.

FIG. 4 is a detail flowchart illustrating a process of generating the display image.

In operation 410, the size of the input image is adjusted. Specifically, the size of the input image is adjusted to an appropriate size for displaying on the display unit 150, so that the display image to be displayed on the display unit 150 is smoothly generated. Here, based on the resolution supported by the display unit 150 or the processing performance of the image processors 141 or 146, the size of the input image may be adjusted.

In operation 420, the display image is generated from the size-adjusted input image. Here, the generated display image has the same frame rate and viewing angle as those of the size-adjusted input image.

Referring back to FIG. 3, in operation 330, the display image is displayed, which is an image generated by a predetermined image signal process to be displayed on the display unit 150.

The first and second input images are divided from the input image. In operation 340, the first and second stored images are generated from the first and second input images, respectively. Although the first and second stored images are independently generated from separate image processors (141 and 146), the first and second stored images have an identical frame rate and resolution. As described above, the process of generating the first and second stored images from the first and second input images, respectively, in which the first and second input images are divided from the input image, is independently performed from the process of generating the display image from the input image. In one example, the process of respectively generating the first and second stored images from the first and second input images is performed independently from the process of generating the display image from the input image to provide a reduction in the effect of delay that may occur during the process of generating a high-definition stored image. Hereinafter, operation 340 for generating the first and second stored images is described in more detail, referring to FIG. 5.

Figure 5:
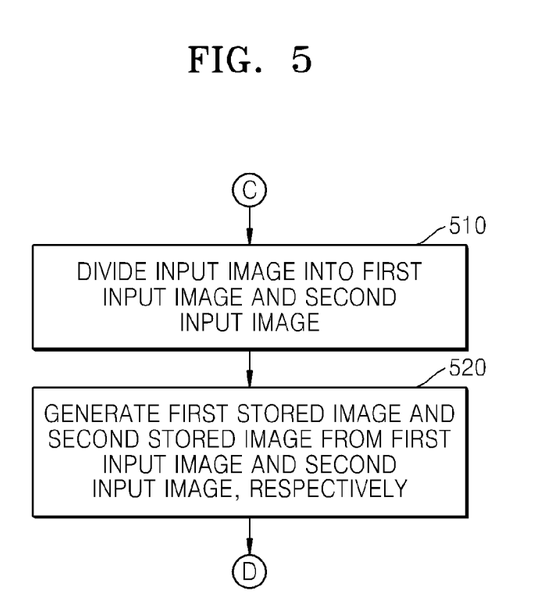
FIG. 5 is a detailed flowchart illustrating a process of generating a first stored image and a second stored image for the method of FIG. 3, according to an embodiment.

FIG. 5 is a detail flowchart illustrating a process of generating first and second stored images.

In operation 510, the input image is divided into the first and second input images. The input image may be divided by a time division, which divides the input image by frames; or a space division, which divides the input image by screen areas. For example, when performing the time division, the frames of the input image are divided into odd numbered and even numbered frames; and then, the odd numbered frames may be set as the first input image, and the even numbered frames may be set as the second input image. Furthermore, when performing the space division, the input image is divided by the screen areas displayed on the display unit 150, and the frames of the input image corresponding to the first area are set as the first input image, and the frames thereof corresponding to the second area are set as the second input image. The division of the input images is performed based on the resolution of the stored image set by the user of the photographing apparatus 100.

In operation 520, from the divided input images, that is, the first and second input images, the first and second stored images are generated, respectively. Specifically, from the first input image, which is a portion of the divided input image, the first stored image is generated, and compressed into an appropriate format. Also, from the second input image, which is an image other than the first stored image of the divided input images, the second stored image with the same frame rate and resolution as those of the first stored image is generated, and compressed into an appropriate format.

Referring back to FIG. 3, in operation 350, a combined image of the first and second stored images is stored as the stored image. In order to generate a high definition image, the first and second stored images, on which at least two image processors independently and respectively performed imaging process and compression, are combined as a single image and stored as the stored image. For the combination process, the first stored image, which has undergone the imaging process and compression in one of the processors, may be transferred to the other image processor, or, in opposite, the second stored image, which has undergone the imaging process and compression, may be transferred to the image processor where the first stored image is stored. Therefore, by combining the first and second stored images, which are stored in the memory of a single image processor, an image with a higher definition, that is, an UHD-level stored image may be generated and stored in the image storage unit 170.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

As described above, according to the one or more of the above embodiments of the invention, by reducing the image display delay that may occur until an actual image input to the photographing apparatus is displayed on the display unit of the photographing apparatus, the user of the photographing apparatus may identify the live view image, and store a high definition image. Thus, the processing performance of the photographing apparatus may be improved and the user-convenience may be increased.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An electronic apparatus comprising:
   an image capture unit that generates an input image by a photoelectric conversion of incident light;
   a first image processor that generates a display image from the input image, wherein the input image is divided into a first input image and a second input image, and generates a first stored image from the first input image;
   a second image processor that generates a second stored image from the second input image;
   a display unit that displays the display image; and
   an image storage unit that stores a combined stored image, wherein the combined stored image is a combination of the first stored image and the second stored image,
   wherein the first input image and the second input image are provided to one of the first image processor or the second image processor, the first image processor and the second image processor independently generate the first stored image and the second stored image, respectively, and the first stored image and the second stored image are combined in one of the first image processor or the second image processor.

2. The electronic apparatus of claim 1, wherein the first image processor comprises:
   a display image processing unit that generates the display image from the input image, wherein the display image and the input image have a same frame rate and viewing angle; and
   a first stored image processing unit that generates the first stored image from the first input image, corresponding to a portion of the divided input image.

3. The electronic apparatus of claim 2, wherein the second image processer comprises a second stored image processing unit that generates the second stored image, with the same frame rate and definition as the first stored image, from the second input image, wherein the second input image is an image other than the first input image of the divided input image.

4. The electronic apparatus of claim 2, wherein the input image is not stored in a first memory in the first image processor, but directly input to the display image processing unit, and the first input image and the second input image are stored in the first memory.

5. The electronic apparatus of claim 1, wherein the combined stored image is an image with an Ultra High Definition (UHD)-level resolution.

6. The electronic apparatus of claim 1, further comprising a pre-processing unit that processes the input image into the first input image and the second input image that may be processed by the first image processor and the second image processor.

7. The electronic apparatus of claim 6, wherein the pre-processing unit comprises:
   a size adjustment unit that adjusts a size of the input image, and outputs the size-adjusted input image to the first image processor; and
   an image division unit that divides the input image into the first input image and the second input image, and outputs the first input image to the first image processor and the second input image to the second image processor.

8. The electronic apparatus of claim 7, wherein the image division unit divides the input image by frames for a time division, or divides the input image by screen areas displayed on the display unit for a space division.

9. The electronic apparatus of claim 7, wherein the image division unit divides the input image according to a definition of the combined stored image, wherein the definition is set by a user of the electronic apparatus.

10. A method of controlling an electronic apparatus, the method comprising:
    generating an input image by a photoelectric conversion of incident light;
    generating a display image from the input image;
    displaying the display image;
    generating a first stored image and a second stored image from a first input image and a second input image, respectively, wherein the first input image and the second input image are divided from the input image; and
    storing a combined stored image, wherein the combined stored image is a combination of the first stored image and the second stored image,
    wherein the display image maintains a same frame rate and viewing angle as the input image, and the first stored image and the second stored image have a same frame rate and definition.

11. The method of claim 10, wherein the first stored image and the second stored image are independently and respectively generated from separate image processors.

12. The method of claim 10, wherein the combined stored image is an image with an Ultra High Definition (UHD)-level resolution.

13. The method of claim 10, further comprising adjusting a size of the input image; and
    generating the display image from the size-adjusted input image.

14. The method of claim 10, further comprising dividing the input image into the first input image and the second input image; and
    generating the first stored image and the second stored image from the first and second input images, respectively.

15. The method of claim 14, wherein the input image is divided by a time division process, which divides the input image by frames; or a space division process, which divides the input image by screen areas.

16. The method of claim 14, wherein the input image is divided according to a definition of the combined stored image set by a user of the electronic apparatus.

17. A non-transitory computer-readable recording medium having recorded thereon a program, which, when executed by a computer, performs the method of claim 10.

18. An electronic apparatus comprising:
    an image capture unit that generates an input image by a photoelectric conversion of incident light;
    a first image processor that generates a display image from the input image, wherein the input image is divided into a first input image and a second input image, and generates a first stored image from the first input image, wherein the first image processor comprises:
       a display image processing unit that generates the display image from the input image, wherein the display image and the input image have a same frame rate and viewing angle; and
       a first stored image processing unit that generates the first stored image from the first input image, corresponding to a portion of the divided input image;
    a second image processor that generates a second stored image from the second input image;

a display unit that displays the display image; and
an image storage unit that stores a combined stored image, wherein the combined stored image is a combination of the first stored image and the second stored image.

19. An electronic apparatus comprising:
an image capture unit that generates an input image by a photoelectric conversion of incident light;
a first image processor that generates a display image from the input image, wherein the input image is divided into a first input image and a second input image, and generates a first stored image from the first input image;
a second image processor that generates a second stored image from the second input image;
a display unit that displays the display image;
an image storage unit that stores a combined stored image, wherein the combined stored image is a combination of the first stored image and the second stored image; and
a pre-processing unit that processes the input image into the first input image and the second input image that may be processed by the first image processor and the second image processor,
wherein a processing performance of the pre-processing unit is proportional to a number of image processors included in the electronic apparatus, rather than the processing performance of any one of the image processors.

* * * * *